United States Patent [19]
Hsu

[11] Patent Number: 5,404,800
[45] Date of Patent: Apr. 11, 1995

[54] CONVECTION OVEN RACK

[75] Inventor: Maxwell Hsu, Taipei,

[73] Assignee: Airlux Electrical Co., Ltd., Chai Wan, Hong Kong

[21] Appl. No.: 239,343

[22] Filed: May 6, 1994

[51] Int. Cl.⁶ .................... P47J 27/00; B65D 25/00
[52] U.S. Cl. ..................... 99/426; 16/110.5;
16/114 A; 16/116 R; 99/449; 126/373;
220/739; 220/753; 220/759; 220/912; 248/146;
248/311.2
[58] Field of Search ............... 99/426, 428, 431, 449,
99/450; 16/110.5, 114 A, 116 R, 110 A; 126/29,
30, 373, 390; 211/71; 220/739, 753, 759, 912;
248/146, 311.2

[56] References Cited

U.S. PATENT DOCUMENTS

| | | | |
|---|---|---|---|
| 673,965 | 5/1901 | Ringenberg | 248/146 |
| 1,147,856 | 7/1915 | Gilchrist | 16/114 A |
| 2,482,704 | 9/1949 | Colfesh, III | 248/146 |
| 2,678,992 | 5/1954 | Koch | 126/373 |
| 3,809,063 | 5/1974 | Hajnal | 126/373 |
| 4,201,795 | 5/1980 | Yamanaka | 16/116 R |
| 4,216,241 | 8/1980 | Thompson | 99/426 |
| 4,872,445 | 10/1989 | Kobayashi et al. | 220/753 |
| 4,928,873 | 5/1990 | Johnson | 220/739 |
| 4,993,675 | 2/1991 | Walker | 248/311.2 |
| 5,170,695 | 12/1992 | Chang | 99/403 |
| 5,217,631 | 6/1993 | Anghileri | 99/426 |

FOREIGN PATENT DOCUMENTS 2657002 7/1991 France .................... 220/912

Primary Examiner—Timothy F. Simone
Attorney, Agent, or Firm—Fields, Lewis, Rost & Smith

[57] ABSTRACT

In accordance with this invention, a convection oven rack is provided which includes a base portion and a plurality of bracket portions attached thereto. Each bracket has a curved interior side that corresponds to the exterior curved shape of a cooking dish insertable between the brackets and on top of the base portion. Attached to the second end of each bracket is a handle portion for gripping. A plurality of padded insulating pads are positioned on the top side of the base portion and the interior side wall of the brackets. In operation, the rack remains attached to the dish during cooking. When cooking is completed, the lid of the dish, which houses a fan and cooking element, is removed so that the rack serves as an insulated holding means whereby food may be served directly from the dish.

11 Claims, 2 Drawing Sheets

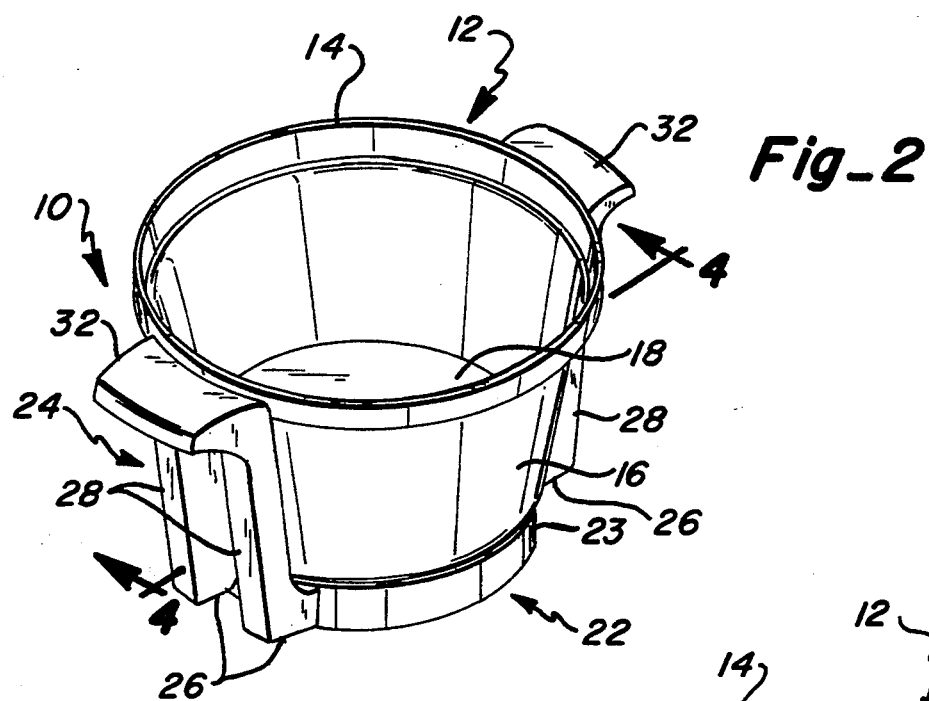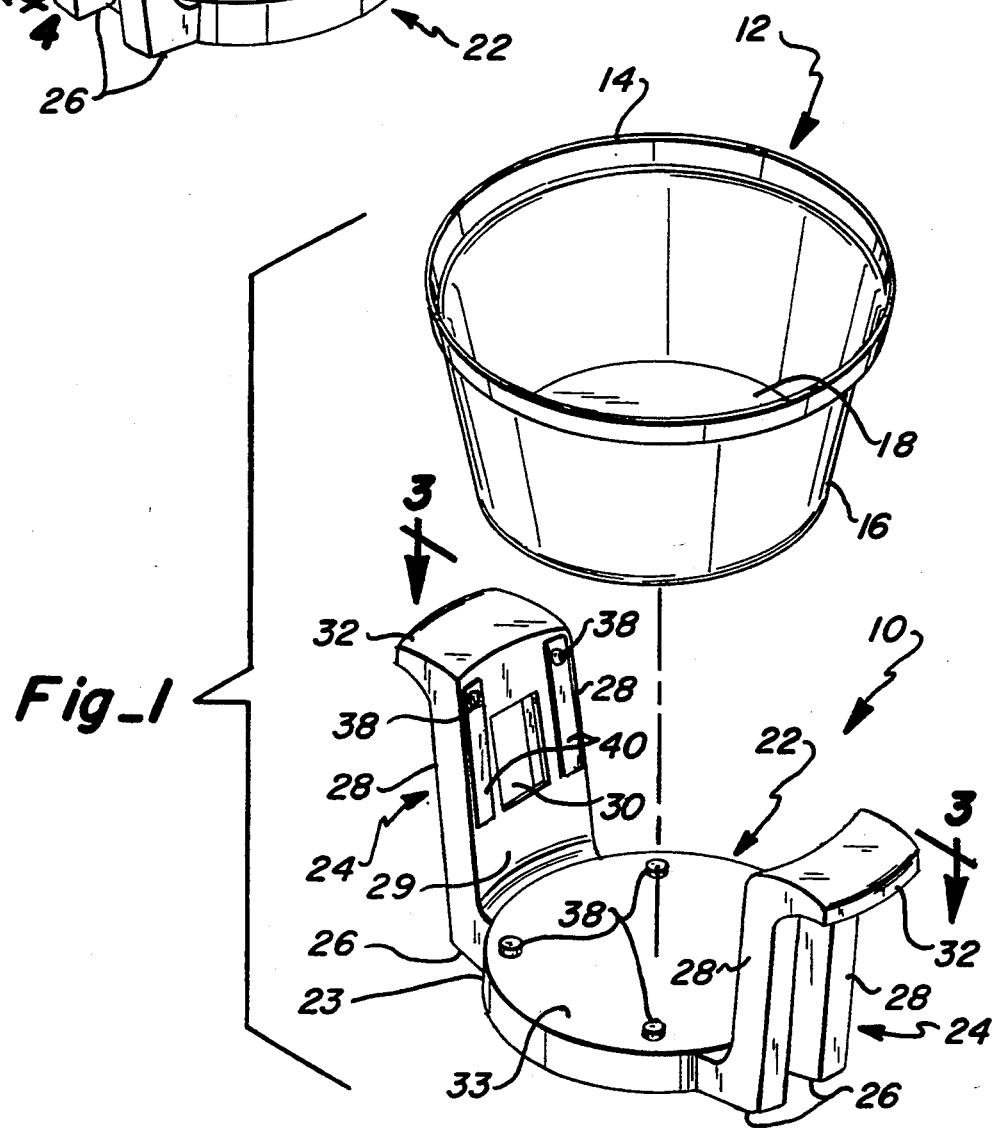

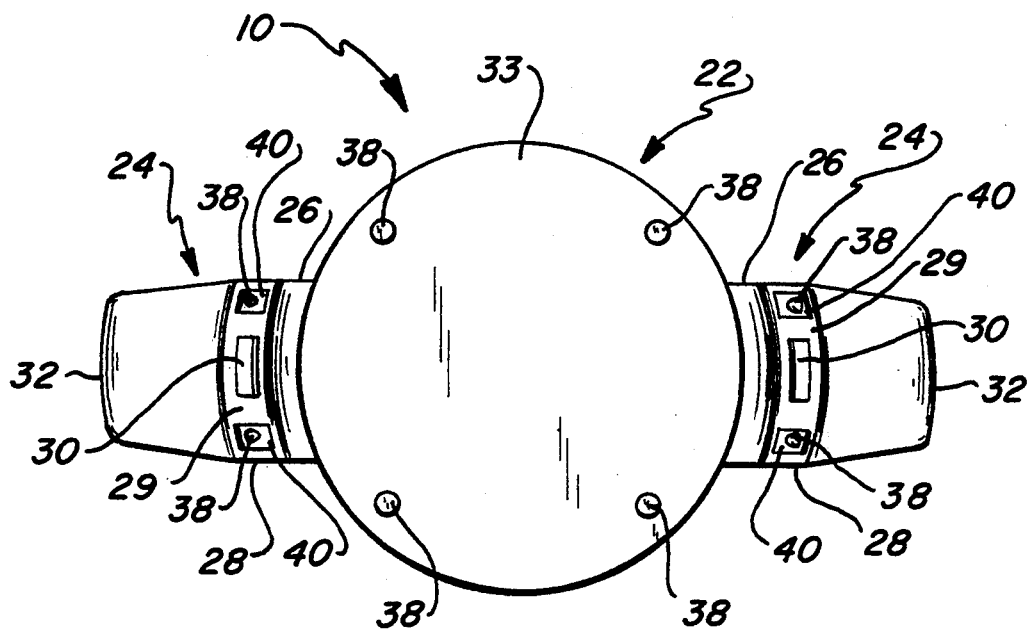
Fig_3
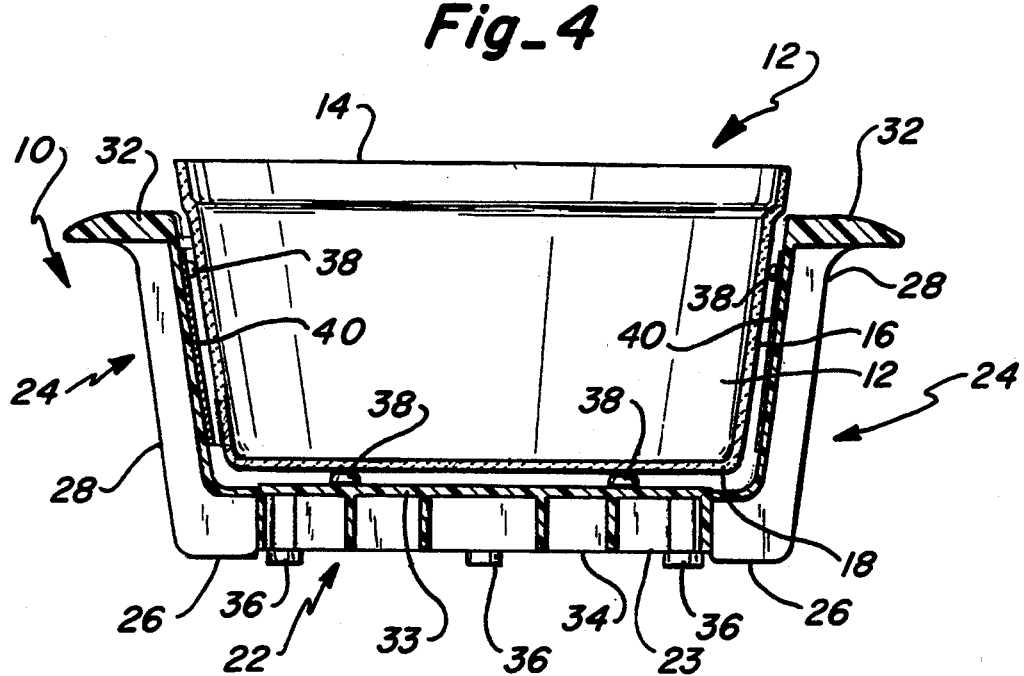
Fig_4

CONVECTION OVEN RACK

TECHNICAL FIELD

This invention relates to a device for holding a cooking dish or the like. More specifically, this invention is a rack for holding the cooking dish of a convection oven, wherein the rack remains attached to the dish during cooking and serving.

BACKGROUND ART

Traditionally, cooking is performed in an oven wherein the cooking dish is heated to the appropriate temperature for the appropriate length of time. When removing the dish from the oven, a heat insulating device must be used in order to avoid burning the hands. Typically, another heat insulating device must then be used to avoid burning the surface on which the dish is to be placed. Thus, any apparatus used to remove the dish from the oven or to aid in serving the food is separate and cannot be attached to the dish while cooking takes place.

This device overcomes the necessity of having to use separate devices when handling the dish immediately after cooking or when serving the food directly from the cooking dish. Thus, one object of this invention is to provide for a device which may securely retain a cooking dish wherein the device may be attached to the cooking dish during cooking. A second object of this invention is to provide for a device which has a convenient handle means whereby the dish may be securely transported from one location to another. Yet another object of this invention is to provide for a device which remains insulated from the heat of the cooking dish.

DISCLOSURE OF THE INVENTION

In accordance with the present invention, a convection oven rack is provided which includes a circular shaped base portion which has a plurality of bracket portions attached thereto. Typically, the brackets are attached to a side edge of the base portion, the brackets extending horizontally and vertically away from the base portion. Each bracket has a curved interior side wall that corresponds to the exterior curved shape of a cooking dish. The cooking dish, shaped like a common bowl, is slidably engaged between the brackets and rests upon the top surface of the base portion.

Each bracket portion, beginning with a first end which is attached to the base portion, includes a plurality of horizontal sections and a corresponding plurality of column sections attached perpendicularly thereto. Typically, there are a pair of column sections which form the vertical extending part of the brackets. Between the columns is formed a web portion that rigidly holds the columns in place. On the web portion is formed an opening. At a second end of the column sections is attached a horizontally extending handle section.

A plurality of insulating pads are positioned on the top side of the base portion and on longitudinal cover strips located on the interior side wall of each of the brackets. The insulating pads serve the purpose of providing for minimal surface area in contact between the device and the bowl such that heat transfer from the bowl to the device is minimized. This is necessary to ensure that when the handles are grasped, they do not attain temperatures that will burn the hand. Additionally, these insulating pads provide a padded frictional surface wherein the bowl is prevented from undesirable rotational or vertical translation. Heat transfer from the bowl to the rack is also minimized by constructing the rack from materials, such as certain polymers, which do not easily conduct heat.

In operation, a lid is placed over the top of the bowl. Conveniently, the lid includes an integral heating element and blower for circulating hot air through the food in the bowl wherein cooking is achieved primarily by convection. The rack remains attached to the bowl during cooking. When cooking is complete, the lid is removed and the rack serves as an insulated holding means wherein the food may be served directly from the bowl without having to use some other heat insulating device to support the bowl.

BRIEF DESCRIPTION OF THE DRAWINGS

FIG. 1 is an exploded perspective view of the convection oven rack and accompanying bowl;

FIG. 2 is a perspective view of the convection rack supporting the bowl;

FIG. 3 is a top view of the rack, taken along line 3—3 of FIG. 1; and

FIG. 4 is a horizontal section taken along line 4—4 of FIG. 2.

BEST MODE FOR CARRYING OUT THE INVENTION

The disclosed invention is a convection oven rack 10 which includes an accompanying bowl 12 that is formed by a generally conical or tapered side wall 16 formed integrally with the bottom wall 18. The upper edge of side wall 16 terminates in an upper lip 14. The convection oven is completed by a lid (not shown) which includes a heating element and blower for circulating hot air through the food in the bowl for cooking the food. Conveniently, the bowl may be made of transparent high temperature glass, such as Pyrex ®, so that the food can be viewed.

The structure of the rack 10 includes a circular shaped base portion 22 that has a substantially uniform vertical side edge 23. A bracket portion 24 having a first and second ends, is attached to the base portion 22 at uniform side edge 23. The first lower end of each bracket portion 24 has an integral horizontal section 26 which is integrally attached to uniform side edge 23. Corresponding to and integral with the horizontal sections 26 are column support sections 28 which extend vertically and outwardly from the base portion 22. Between the column sections 28 is formed a web section 29 which serves to rigidly hold the column sections 28 in place. The web section 29 has an opening 30 which helps to ventilate the bracket which is in near contact with the bowl 12, thus reducing some of the heat transfer from the bowl 12 to the rack 10. At the second upper end of the column sections 28 is an integral horizontally extending handle 32. The handle 32 is large enough so that it is conveniently gripped by the hand to lift the convection oven. Advantageously, the convection oven rack 12 may be injection molded as a single piece from suitable plastic which has heat insulating qualities, such as polystyrene or polypropolene.

In operation, the bowl 12 is slidably lowered between and engaged by the brackets 24 and rests upon the top side 33 of base portion 22. On the bottom side 34 of the base 24 are positioned a plurality of foot pads 36 which provide a frictional surface to prevent the rack 10 from sliding while positioned.

The interior side of each of the brackets 24 are curved to conform to the exterior shape of the bowl 12. A plurality of insulating pads 38 are positioned on the top side 33 of the base portion 22 and on longitudinal cover strips 40 located on the interior side of brackets 24. The longitudinal cover strips 40 are made of the same material as the brackets 24 and are attached integrally thereto. The purpose of the strips 40 is to cover openings (not shown) in the brackets 24 that are created during the injection molding process of the brackets 24. The insulating pads 38 may typically be made of silicone rubber. The purposes of the insulating pads 38 is threefold. The first purpose is to provide for minimal contact surface area between the bowl 12 and the rack 10 such that a minimal amount of heat is transferred from the heated bowl after cooking. Secondly, the pads 38 provide a frictional surface in order that the bowl 12 be prevented from undesirable rotation or vertical translation. Thirdly, the pads 38 provide for a cushioned surface to prevent damage to the bowl when the bowl is lifted up or down in sliding engagement between the brackets 24 and onto the base portion 22.

While the preferred embodiment discloses a pair of column sections 28, it will be understood that any number of column sections can be used to provide for the necessary support. Additionally, it will be understood that any desired number of bracket portions 24 can be used to ensure adequate support for the engaged bowl 12. Furthermore, in another embodiment (not shown), it is contemplated that the handles 32 could comprise of a circular ring member which attaches to the second upper end of the column sections 28. This member can be rotatable about a pair of pivot pins which serve to attach the member to the brackets 24. Finally, it will be understood that the insulating pads 38 can be replaced with any suitable insulating device, such as a strip of Teflon ® coated rubber, wherein the device also has frictional and padded characteristics.

This invention has been described in detail with reference to particular embodiments thereof, but it will be understood that various other modifications can be effected within the spirit and scope of this invention.

I claim:

1. A rack for retaining a bowl, said rack comprising:
   a base portion having a top and bottom side;
   a plurality of brackets each having a first and second ends, said first ends of said brackets attached to said base portion, said brackets including a plurality of substantially parallel column support sections, a web section interconnecting said support sections, and a curved interior side conforming to the shape of said bowl; and
   a handle portion attached to each of said second ends of said brackets, said bowl being slidably engaged between said brackets and positionable upon said base portion.

2. An apparatus, as claimed in claim 1, further comprising:
   a plurality of insulating pads attached to the top side of said base portion and the interior side of said plurality of brackets, said pads being made of an insulated and resilient material such that said bowl is cushioned and insulated from said rack when engaged between said brackets.

3. An apparatus, as claimed in claim 2, wherein said plurality of pads have a frictional surface in contact with said bowl to substantially reduce rotational or vertical translation of said bowl while engaged.

4. An apparatus, as claimed in claim 1, further comprising:
   an opening formed in said web to ventilate heat transferable from said bowl to said brackets.

5. A rack for retaining a bowl, said rack comprising:
   a circular shaped base portion having an edge of a substantially uniform thickness and a top and bottom side;
   a plurality of brackets each having a first and second ends, said first ends of said brackets attached to said edge of said base portion, said brackets having a curved interior side that corresponds to an exterior surface of said bowl, said brackets including:
   (i) a plurality of horizontal sections at said first end attached to and extending radially away from said edge of said base portion;
   (ii) a plurality of column support sections corresponding to said horizontal sections, said column support sections each having first and second ends, said first ends of said support sections attached to said corresponding horizontal sections;
   (iii) a web section positioned between and integral with said column support sections; and
   (iv) an opening formed in said web; and
   a handle portion attached to each of said second ends of said column sections, said bowl being slidably engaged between said brackets and positionable upon said base portion.

6. An apparatus, as claimed in claim 5, further comprising:
   a plurality of insulating pads attached to the top side of said base portion and the interior side of said plurality of brackets, said pads being made of an insulated and resilient material such that said bowl is cushioned and insulated from said rack when engaged between said brackets.

7. An apparatus, as claimed in claim 6, wherein said plurality of pads have a frictional surface in contact with said bowl to substantially reduce rotational or vertical translation of said bowl while engaged.

8. An apparatus for holding and serving food, said apparatus comprising:
   a bowl having a cylindrical side wall, a circular shaped bottom attached perpendicularly to said side wall, and a lip portion defining an upper edge of said side wall
   a rack including;
   a circular shaped base portion having an edge of a substantially uniform thickness;
   a plurality of brackets each having a first and second ends, said first ends of said brackets attached to said edge of said base portion, said brackets having a curved interior side that corresponds to an exterior surface of said bowl, said brackets including:
   (i) a plurality of horizontal sections at said first end attached to and extending radially away from said edge of said base portion;
   (ii) a plurality of column support sections corresponding to said horizontal sections, said column support sections each having first and second ends, said first ends of said support sections attached to said corresponding horizontal sections;
   (iii) a web section positioned between and integral with said column support sections; and (iv) an opening formed in said web; and a handle portion attached to each of said second ends of said column sections, said bowl being slidably engaged between said brackets and positionable upon said base portion.

9. An apparatus, as claimed in claim 8, further comprising:

a plurality of insulating pads attached to the top side of said base portion and the interior side of said plurality of brackets, said pads being made of an insulated and resilient material such that said bowl is cushioned and insulated from said rack when engaged between said brackets.

10. An apparatus, as claimed in claim 9, wherein said plurality of pads have a frictional surface in contact with said bowl to substantially reduce rotational or vertical translation of said bowl while engaged.

11. An apparatus, as claimed in claim 8, further comprising:

an opening formed in said web to ventilate heat transferable from said bowl to said brackets.

* * * * *